US010412261B2

(12) United States Patent
Iida et al.

(10) Patent No.: US 10,412,261 B2
(45) Date of Patent: Sep. 10, 2019

(54) IMAGE FORMING APPARATUS CAPABLE OF PERFORMING PRINT RECOVERY PROCESSING

(71) Applicant: CANON KABUSHIKI KAISHA, Tokyo (JP)

(72) Inventors: Toshihiko Iida, Toride (JP); Yoshiji Kanamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/008,383

(22) Filed: Jun. 14, 2018

(65) Prior Publication Data

US 2018/0376025 A1 Dec. 27, 2018

(30) Foreign Application Priority Data

Jun. 21, 2017 (JP) ................................ 2017-121505

(51) Int. Cl.

*G06F 3/12* (2006.01)
*H04N 1/32* (2006.01)
*H04N 1/00* (2006.01)

(52) U.S. Cl.

CPC ......... *H04N 1/3263* (2013.01); *G06F 3/1204* (2013.01); *G06F 3/1259* (2013.01); *H04N 1/00652* (2013.01)

(58) Field of Classification Search

None

See application file for complete search history.

(56) References Cited

U.S. PATENT DOCUMENTS

| | | | | |
|---|---|---|---|---|
| 8,619,298 B2 * | 12/2013 | Marunouchi | G06F 3/1207 358/1.14 |
| 2005/0179933 A1 * | 8/2005 | Akao | G06F 21/608 358/1.14 |
| 2007/0206210 A1 * | 9/2007 | Miyazaki | G03G 15/5012 358/1.14 |
| 2011/0205575 A1 * | 8/2011 | Karasawa | H04N 1/00347 358/1.14 |
| 2012/0194835 A1 * | 8/2012 | Karasawa | H04N 1/00347 358/1.12 |
| 2015/0077785 A1 * | 3/2015 | Harano | G06F 3/121 358/1.14 |

(Continued)

FOREIGN PATENT DOCUMENTS

| | | |
|---|---|---|
| JP | H09311770 A | 12/1997 |
| JP | 2008194849 A | 8/2008 |

*Primary Examiner* — Dung D Tran

(74) *Attorney, Agent, or Firm* — Rossi, Kimms & McDowell LLP

(57) ABSTRACT

An image forming apparatus receives print data and settings of a print job which are associated with the print data from an external apparatus via an external interface. A printer section forms an image on a sheet fed from a sheet feeder based on the received print data. It is determined whether or not the settings of the print job include a setting of not performing print recovery processing after sheet jam elimination, and in a case where it is determined that the settings of the print job include the setting of not performing print recovery processing after sheet jam elimination, the print job is cancelled in response to occurrence of a sheet jam in the printer section, and a user is notified of information prompting the user to input the print job again.

11 Claims, 7 Drawing Sheets

(56) References Cited

U.S. PATENT DOCUMENTS

| | | | | |
|---|---|---|---|---|
| 2017/0097798 | A1* | 4/2017 | Kuroda | G06F 3/1204 |
| 2017/0109107 | A1* | 4/2017 | Kuroda | G06F 3/1204 |
| 2017/0206042 | A1* | 7/2017 | Kashiwagi | G06F 3/1204 |

* cited by examiner

<DigitalPrintingParams Class="Parameter" ID="IDDPP" Status="Available" cj:PaperJamRecoveryMode="false"/>

*FIG. 7A*

```
<Notification Class=”Information” JobID=”JobID01” Type=“Error” TimeStamp=“2017-02-22T16:54:24+09:00”>
 <Comment Language=”en” Name=”Description”>
  The job has been canceled because of a paper jam. It needs reprinting.
 </Comment>
</Notification>
```

*FIG. 7B*

```
<Notification Class=”Information” JobID=”JobID01” Type=“Error” TimeStamp=“2017-02-22T16:54:24+09:00”>
 <Comment Language=”en” Name=”Description”>
  The job has been terminated without a paper jam. No needs reprinting.
 </Comment>
</Notification>
```

IMAGE FORMING APPARATUS CAPABLE OF PERFORMING PRINT RECOVERY PROCESSING

BACKGROUND OF THE INVENTION

Field of the Invention

The present invention relates to an image forming apparatus that forms images on sheets based on image data and is capable of performing print recovery processing.

Description of the Related Art

In accordance with recent improvement of image forming apparatuses in processing speed and image quality, a printing method called POD (Print On Demand) has been realized in which digital data is directly printed without performing a plate making process and a machine plate-making process of the conventional offset printing.

The POD makes it possible to perform small-lot wide-variety printing, and shorten the time of delivery, whereby it is possible to reduce inventories. Further, to make it possible to handle various kinds of prints, there has been proposed means for making detailed settings, on a job-by-job basis, using a job ticket, such as a JDF (Job Definition Format) job ticket. Further, since various kinds of prints are handled, various qualities and reliabilities are required depending on the type of prints. For example, in the case of envelopes receiving postal mails, if the print quality is low, the postal mails cannot be delivered to correct addresses, and in the case of documents, such as certificates, if page duplication or page missing occurs, the reliability of documents is lost. Therefore, the quality is most important for these types of prints. On the other hand, for prints of the same contents, printed in large numbers, such as advertisement leaflets and in-house documents, importance is placed on costs and printing speeds rather than quality.

Incidentally, in the case of occurrence of an error, such as a sheet jam (paper jam) in which a sheet being conveyed is jammed in an image forming apparatus, printing is sometimes stopped. When printing is stopped, an operation for removing the sheet remaining within the apparatus is performed by a user, and normally, after removing the jammed sheet, recovery processing for automatically resuming the stopped print processing is performed (see Japanese Laid-Open Patent Publication (Kokai) No. H09-311770).

Recovery processing is realized by detecting a state of discharge of sheets at the time of occurrence of a sheet jam, using a sensor, and determining a page from which print processing is to be resumed. However, the position of the sensor is different depending on the apparatus, and hence it is not necessarily possible to resume print processing from the correct page, which sometimes causes page duplication or page missing. To solve this problem, there has been proposed a technique in which in the case of occurrence of a sheet jam, execution of a job suffering from the sheet jam is stopped, and printing is performed again from the first page of the job (see Japanese Laid-Open Patent Publication (Kokai) No. 2008-194849).

SUMMARY OF THE INVENTION

The present invention provides an image forming apparatus that is capable of causing a user to recognize an operation required to be performed after sheet jam elimination, with respect to a job of which the job settings include a setting of not performing print recovery processing after sheet jam elimination.

In a first aspect of the present invention, there is provided an image forming apparatus comprising a reception unit configured to receive print data and settings of a print job which are associated with the print data, a sheet feeding unit configured to feed sheets, an image forming unit configured to form images, a control unit configured to control the image forming unit to form an image on a sheet fed from the sheet feeding unit based on the received print data, and a notification unit configured to perform notification of information to a user, wherein the control unit determines whether or not the settings of the print job include a setting of not performing print recovery processing after sheet jam elimination, and in a case where it is determined that the settings of the print job include the setting of not performing print recovery processing after sheet jam elimination, the control unit stops the print job in response to occurrence of a sheet jam in the image forming unit, and controls the notification unit to perform notification of information prompting the user to input the print job again.

In a second aspect of the present invention, there is provided an image forming apparatus comprising a sheet feeding unit configured to feed sheets, an image forming unit configured to form images, a communication unit configured to transmit and receive information to and from an external apparatus, and a control unit configured to control the image forming unit to form an image on a sheet fed from the sheet feeding unit, based on print data and settings of a print job which are associated with the print data, received via the communication unit, wherein the control unit determines whether or not the settings of the print job include a setting of not performing print recovery processing after sheet jam elimination, and in a case where it is determined that the settings of the print job include the setting of not performing print recovery processing after sheet jam elimination, the control unit stops the print job in response to occurrence of a sheet jam in the image forming unit, and controls the notification unit to perform notification of information prompting the external apparatus to transmit the print job again, to the external apparatus.

According to the present invention, in a case where a job of which the job settings include the setting of not performing print recovery processing after sheet jam elimination is stopped due to occurrence of a sheet jam, the user is notified that it is necessary to set the job again. This makes it possible to avoid such an inconvenience that the user forgets to set the job again, or is delayed in setting the job again.

Further features of the present invention will become apparent from the following description of exemplary embodiments (with reference to the attached drawings).

BRIEF DESCRIPTION OF THE DRAWINGS

FIGS. 7A and 7B are diagrams each showing what is notified to a user, in a case where the job settings include the setting of not performing recovery processing after sheet jam elimination.

DESCRIPTION OF THE EMBODIMENTS

The present invention will now be described in detail below with reference to the accompanying drawings showing embodiments thereof.

Figure 1:
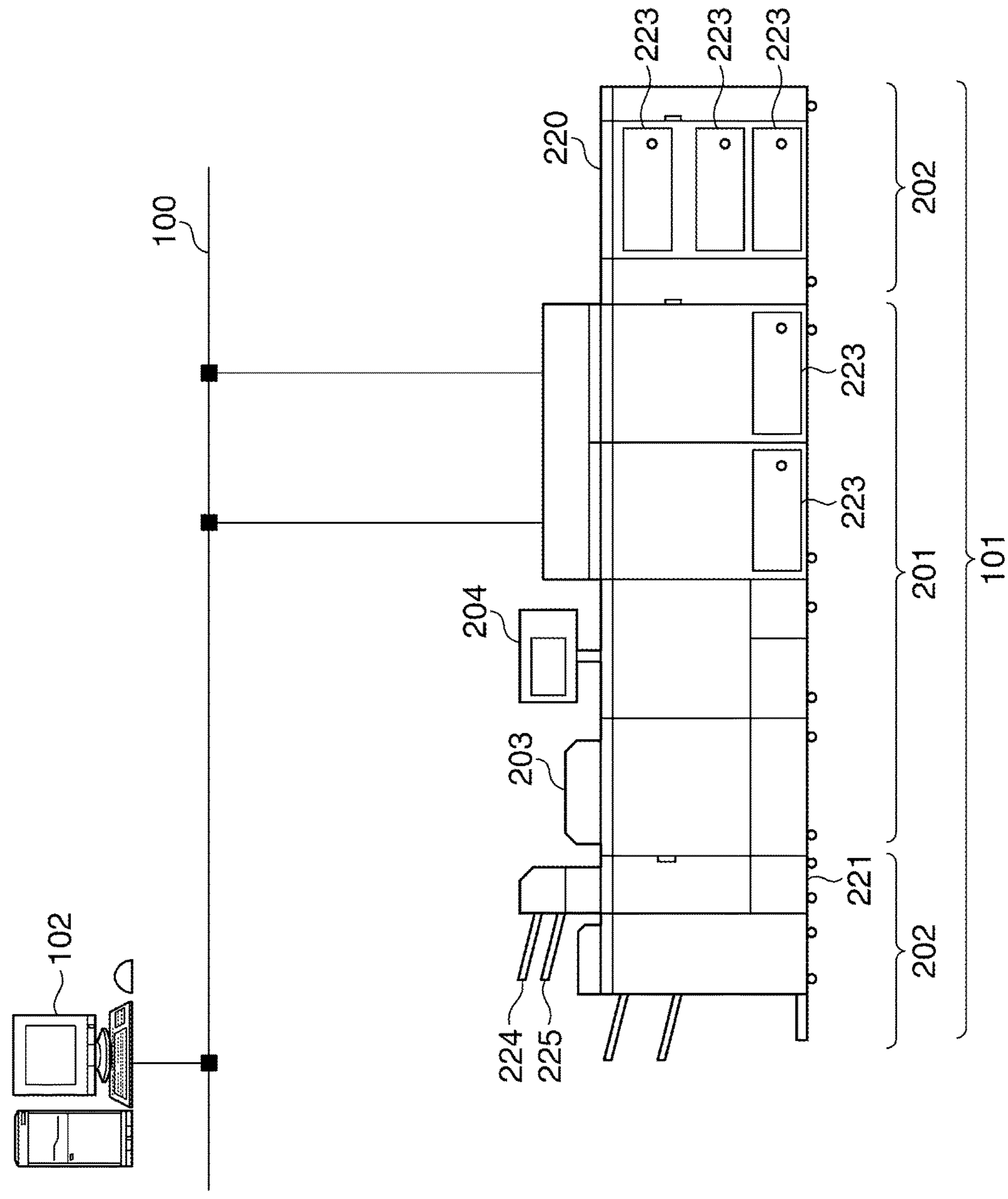
FIG. 1 is a schematic diagram of a printing system including an image forming apparatus according to embodiments.

FIG. 1 is a schematic diagram of a printing system including an image forming apparatus according to embodiments. In this printing system, the image forming apparatus, denoted by reference numeral 101, is an MFP (Multifunction Peripheral), and is communicably connected to a PC 102 as an information processing apparatus via a network 100. The MFP 101 is mainly comprised of a printer section 201, a large-capacity sheet feeder 220, and an inserter 221. A scanner section 203 and a console section 204 are arranged on the top of the printer section 201. The console section 204 provides various interfaces used when making various settings for the printer section 201 and operating the same.

First, the PC 102 as the information processing apparatus will be described. The PC 102 is capable of executing various programs including an application program for inputting a job. Further, a printer driver having a function for converting print data to printer-language data compatible with the MFP 101 is installed in the PC 102. A user who performs printing can provide a print instruction from the various applications and the like. In response to the print instruction, the printer driver converts data output by an application program to print data which can be interpreted by the MFP 101, and transmits the converted data to the MFP 101.

Next, the MFP 101 will be described. The MFP 101 has a reading function for reading an image on a sheet, and a print function for printing an image on a sheet. Further, the MFP 101 has a post-processing function for binding a plurality of sheets each having an image printed thereon, aligning a plurality of sheets, and allocating discharge destinations of a plurality of sheets to a plurality of trays. Printing sheets include sheets of plain paper, thick paper, films, and so forth.

The MFP 101 is constructed by interconnecting a plurality of apparatuses which have different rolls, and is capable of performing complicated sheet processing. The following description is given of components of the MFP 101.

The printer section 201 forms (prints) an image on a sheet fed from a sheet feeder using toner based on image data. The construction and operating principles of the printer section 201 are described hereafter.

Beams of light, such as laser beams, demodulated according to image data are reflected by a rotary polygon mirror for irradiation onto a photosensitive drum as scanning light to thereby form an electrostatic latent image on the photosensitive drum. The electrostatic latent image formed on the photosensitive drum is developed with toner, and the toner image is transferred onto a sheet affixed to a transfer drum. This series of image forming processes are sequentially performed with respect to toners of the colors of yellow (Y), magenta (M), cyan (C), and black (K), whereby a full-color image is formed on the sheet by superimposing the plurality of toner images. The printer section 201 may be configured to apply a toner of a color referred to as a specific color, a transparent toner, or the like, in addition to toners of the four colors. The sheet on the transfer drum, which has the full-color image transferred thereon, is conveyed to a fixing device. The fixing device fixes the toners on the sheet having the toner image transferred thereon by melting the toners with heat and pressure.

The large-capacity sheet feeder 220 is sheet feeding means which can be attached to and removed from the printer section 201. The large-capacity sheet feeder 220 includes a plurality of sheet feeders 223. The printer section 201 can perform print processing for a large number of printing sheets, using the plurality of sheet feeders 223.

The inserter 221 is an apparatus used when a sheet on which image formation is not performed is inserted into print deliverables generated by the printer section 201. Referring to FIG. 1, the inserter 221 includes two trays 224 and 225.

As is clear from FIG. 1, the MFP 101 can be roughly separated into three parts, with the printer section 201 in the center. In FIG. 1, an apparatus arranged on the right side of the printer section 201 is referred to as the sheet feed-related apparatus, and the major roll of the sheet feed-related apparatus is to continuously supply sheets accommodated therein to the printer section 201 at proper timings. Further, the sheet feed-related apparatus detects a remaining amount of sheets accommodated therein. The printer section 201 also include sheet feeders 223 each of which is capable of performing functions equivalent to those of the sheet feed-related apparatus. The sheet feeders included in the printer section 201 are also referred to as part of the sheet feed-related apparatus for convenience of explanation.

On the other hand, in FIG. 1, the apparatuses including the inserter 221, which are arranged on the left side of the printer section 201, are referred to as the sheet processing-related apparatus. The sheet processing-related apparatus is sometimes referred to as the sheet handling apparatus or the post-processing apparatus. The sheet processing-related apparatus performs various processing on sheets on which print processing has been completed, or performs processing for accumulating sheets, and so forth. The sheet feed-related apparatus and the sheet processing-related apparatuses are hereinafter collectively referred to as a sheet handling apparatus 202.

Next, the control configuration of the image forming apparatus appearing in FIG. 1 will be described.

Figure 2:
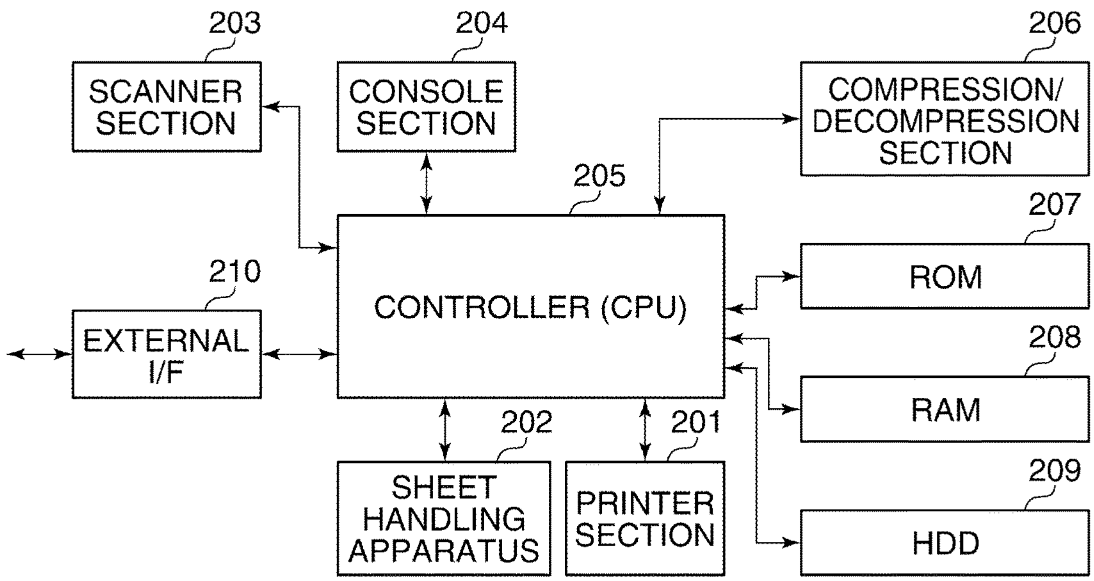
FIG. 2 is a control block diagram of the image forming apparatus appearing in FIG. 1.

FIG. 2 is a control block diagram of the image forming apparatus appearing in FIG. 1. For the sake of easy-to-understand illustration of the control of the system, the block diagram in FIG. 2 shows control-related components of the printer section 201 appearing in FIG. 1, separately from the printer section 201. That is, in the following description related to the control of the MFP 101, the printer section 201 refers to part thereof excluding these control-related components.

Referring to FIG. 2, the MFP 101 includes a controller (hereinafter referred to as the CPU) 205. The CPU 205 is connected to the printer section 201, the sheet handling apparatus 202, the scanner section 203, the console section 204, a compression/decompression section 206, a ROM 207, a RAM 208, an HDD 209, and an external interface (I/F) 210.

The MFP 101 is a multifunction processing apparatus (image forming apparatus) having a plurality of functions. More specifically, the MFP 101 stores data received from the scanner section 203 in the HDD 209, reads the stored data from the HDD 209, and prints the read data by the printer section 201. Further, the MFP 101 is capable of storing job data received from an external apparatus via the external interface 210 as a communication unit, in the HDD 209, reading the stored job data from the HDD 209, and printing the read job data by the printer section 201. The MFP 101 may be either an apparatus capable of color printing or an apparatus dedicated to monochrome printing.

In FIG. 2, the printer section 201 forms an image on a sheet fed from the sheet feeder using toner based on image data. The scanner section 203 reads an original image, performs image processing on the obtained image data, and outputs the processed image data. The console section 204 includes a display section which also functions as a user interface.

The CPU 205 reads and executes programs stored in the ROM 207 so as to perform centralized control of the overall processes and operations of various units of the MFP 101, thereby causing them to perform various operations. Further, the CPU 205 performs an operation for interpreting page description language (hereinafter referred to as the "PDL") data received from an external apparatus via the external interface 210 and converting the PDL data into raster image data (bitmap image data). Similarly, the CPU 205 interprets and processes a job received from an external apparatus via the external interface 210.

The CPU 205 stores data of a job to be processed, which is input via various input units, such as the scanner section 203 and the external interface 210, in the HDD 209, reads the stored data from the HDD 209, outputs the read data to the printer 201, and causes the printer section 201 to perform printing based on the data. Further, the CPU 205 is capable of transmitting job data read from the HDD 209 to an external apparatus via the external interface 210.

The compression/decompression section 206 compresses and decompresses e.g. image data stored in the RAM 208 or the HDD 209 by various compression methods, such as JBIG and JPEG. The ROM 207 is a read-only memory, and stores the various programs including a boot sequence, and font information. Some of the programs stored in the ROM 207 will be described in detail hereinafter. The ROM 207 stores programs for various processes performed by the CPU 205. Further, the ROM 207 stores a display control program for displaying various user interface screens (hereinafter referred to as the "UI screens") on the display section of the console section 204.

The RAM 208 is a readable and writable memory, and stores image data sent from the scanner section 203 or the external interface 210, various programs, setting information, and so forth. The HDD 209 stores image data compressed by the compression/decompression section 206. The HDD 209 also stores various management information items which are permanently stored, changed, and managed by the MFP 101. The HDD 209 is a nonvolatile memory for storing a plurality of data items, including print data, of a plurality of jobs to be processed. The external interface 210 transmits and receives image data or the like to and from a facsimile machine, a network-connected apparatus, and an external dedicated apparatus.

Figure 3:
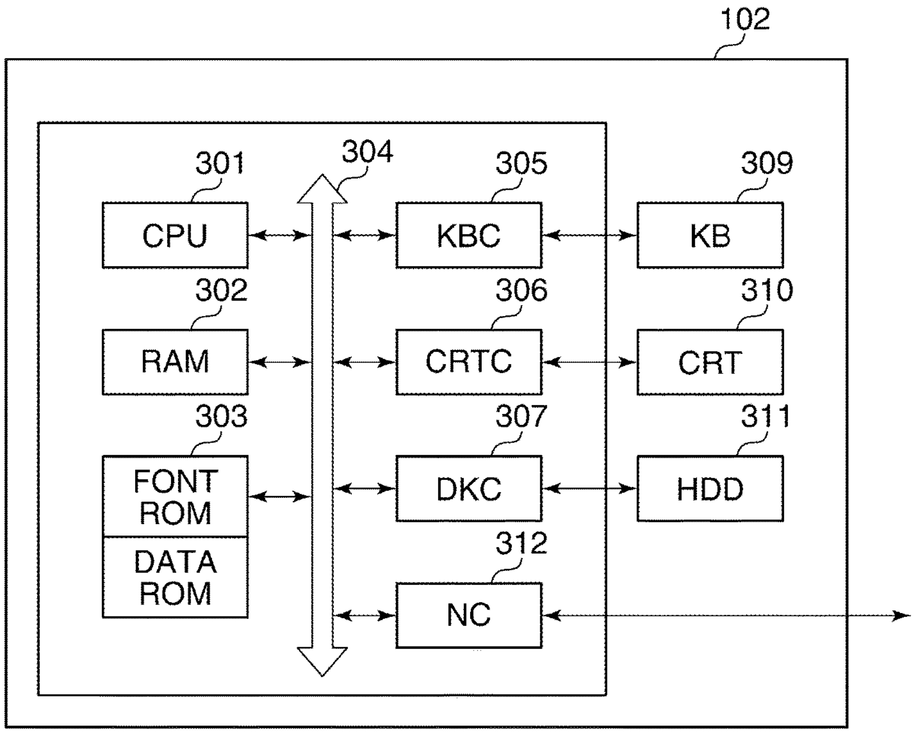
FIG. 3 is a control block diagram of an information processing apparatus (PC) appearing in FIG. 1.

FIG. 3 is a control block diagram of the information processing apparatus (PC) 102 appearing in FIG. 1. Referring to FIG. 3, the PC 102 includes a CPU 301. The CPU 301 is connected to a RAM 302, a ROM 303, a KBC 305, a CRTC 306, a DKC 307, and an NC 312 via a bus 304. Further, the CPU 301 is connected to a KB 309 via the KBC 305, and to a CRT 310 via the CRTC 306. Further, the CPU 301 is also connected to an HDD 311 via the DKC 307.

The CPU 301 executes programs, such as an OS, general applications, and a bookbinding application, which are loaded from a program ROM of the ROM 303 or the HDD 311 into the RAM 302.

The RAM 302 functions as a main memory, a work area, and so forth, for the CPU 301. The ROM 303 has a font ROM and a data ROM, and stores various programs. The KBC (keyboard controller) 305 controls an input from the KB (keyboard) 309 and a pointing device, not shown. The CRTC (display controller) 306 controls the display on the CRT (display section) 310. The DKC (disk controller) 307 controls an access to the HDD 311 and the like that store a boot program, various applications, font data, user files, and so forth.

The NC (network controller) 312 is connected to the network 100, and controls communication with other apparatuses connected to the network 100. The bus 304 connects between the CPU 301, the RAM 302, the ROM 303, and the various controllers, to convey data signals and control signals between these components.

Next, a printing process performed by the image forming apparatus, appearing in FIG. 1, will be described.

Figure 4:
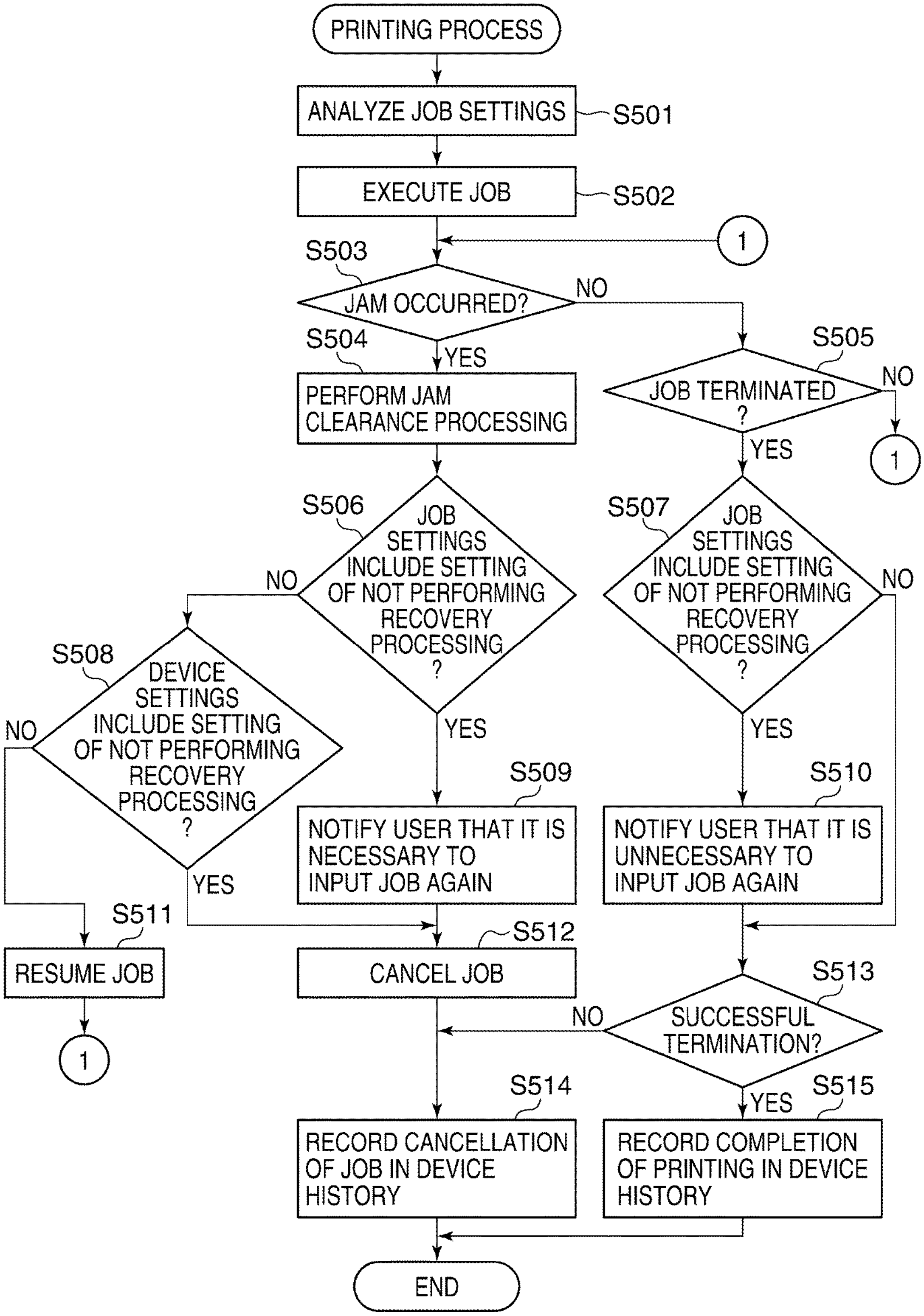
FIG. 4 is a flowchart of a printing process performed by the image forming apparatus.

FIG. 4 is a flowchart of the printing process performed by the image forming apparatus, appearing in FIG. 1. This printing process is performed by the CPU 205 according to a printing process program stored in the ROM 207. The printing process is started when a print job is received from the PC 102 as the information processing apparatus via the external interface 210.

Referring to FIG. 4, when the printing process is started, first, the CPU 205 analyzes the job settings associated with print data (step S501). The job settings are specified e.g. by a job ticket (JDF). The job settings can include all settings concerning print processing. More specifically, the job settings can include not only specification of one of the sheet feeders 223 of the large-capacity sheet feeder 220, which is to be used for printing, specification of sheet processing to be performed by the sheet handling apparatus 202, specification of image processing to be performed by the printer section 201, and so forth, but also specification associated with recovery processing (print recovery processing) to be performed when a sheet jam (paper jam) occurs.

Figures 5, 6:
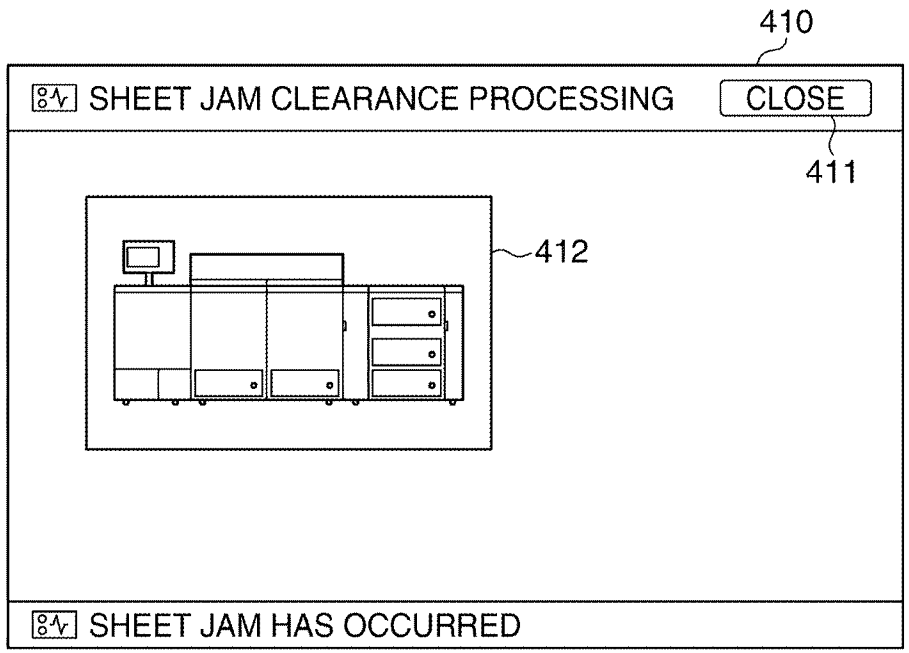
FIG. 5 is a diagram of part of a job ticket based on a JDF data format in a case where job settings include a setting of not performing recovery processing after sheet jam elimination.
FIG. 6 is a diagram of a sheet jam elimination-prompting screen displayed on a console section at the time of jam clearance processing.

FIG. 5 is a diagram of part of a job ticket based on a data format called JDF (Job Definition Format) in a case where the job settings include a setting of not performing recovery processing after sheet jam elimination. In the job ticket, a type of the setting is entered as an attribute, and a value of the setting is entered as an attribute value.

In FIG. 5, the recovery processing after sheet jam elimination is specified by an attribute of "cj:PaperJamRecoveryMode" and an attribute value of "false". In a case where the recovery processing after sheet jam elimination is set to be performed, the value of the attribute of "cj:PaperJamRecoveryMode" is set to "true". In the job ticket shown in FIG. 5, the recovery processing after sheet jam elimination is set not to be performed.

Referring again to FIG. 4, after analyzing the job settings (step S501), the CPU 205 executes the received job (step S502). In this step, the CPU 205 controls the compression/decompression section 206 to decompress image data which was stored in the HDD 209 at the time of receipt of the job, and controls the printer section 201 to perform printing while causing the job settings analyzed in the step S501 to be reflected thereon. After execution of the job (step S502), the CPU 205 determines whether or not a sheet jam has occurred in the executed job (step S503).

If it is determined in the step S503 that a sheet jam has occurred (YES to the step S503), the CPU 205 performs jam clearance processing (step S504).

FIG. 6 is a diagram of a sheet jam elimination-prompting screen 410, displayed on the console section 204 during the jam clearance processing. The sheet jam elimination-prompting screen 410 is a screen for notifying the user of occurrence of a sheet jam, and prompting the user to remove a jammed sheet.

Referring to FIG. 6, a sheet jam occurrence location display area 412 is an area for displaying a location where a sheet jam has occurred. Not only a sheet jam occurrence location, but also a procedure for removing the jammed sheet is shown by displaying an animation or a moving image in this area. If there are jammed sheets at a plurality of locations, the occurrence location of one of the jammed sheets is displayed, and whenever a jammed sheet is removed, the occurrence location of one of the remaining jammed sheets is displayed. When all of the jammed sheets have been removed, it is regarded that sheet jam elimination has been completed, and the sheet jam elimination-prompting screen 410 is changed to a screen displayed before displaying the sheet jam elimination-prompting screen 410.

A close button 411 on the sheet jam elimination-prompting screen 410 is a button for closing the sheet jam elimination-prompting screen 410. When the close button 411 is selected, the sheet jam elimination-prompting screen 410 is changed to a screen displayed before displaying the sheet jam elimination-prompting screen 410. In a case where the close button 411 is selected to close the sheet jam elimination-prompting screen 410, it is regarded that the sheet jam elimination is not completed, and print recovery processing as processing to be performed on the job after sheet jam elimination, or cancel processing of the job is not performed.

Referring again to FIG. 4, after execution of the jam clearance processing (step S504), the CPU 205 determines whether or not the job settings analyzed in the step S501 include the setting of not performing recovery processing (step S506). If it is determined in the step S506 that the job settings include the setting of not performing recovery processing (YES to the step S506), the CPU 205 proceeds to a step S509. In this step, the CPU 205 notifies the PC 102 that it is necessary to set the job again, via the external interface 210 (step S509). In this case, a message to the effect that it is necessary to input or transmit the job again may be displayed on the display screen of the console section 204 simultaneously or singly. This enables the user, in a case where the user is near the MFP 101 or a case where the PC 102 is installed near the MFP 101, to know that it is necessary to input the job again, by viewing the display screen of the console section 204.

FIGS. 7A and 7B are diagrams each showing what is notified to the PC 102 in a case where the job settings include the setting of not performing recovery processing after sheet jam elimination. FIG. 7A shows an example of message data for notifying to the effect that a sheet jam has occurred and it is necessary to input the job again, whereas FIG. 7B shows an example of message data for notifying to the effect that the job has been terminated without occurrence of a sheet jam and it is unnecessary to input the job again.

In a case where a sheet jam has occurred during execution of a job of which the job settings include the setting of not performing recovery processing after sheet jam elimination, after performing the jam clearance processing (step S504), a message based on the message data shown in FIG. 7A is notified (step S509). By displaying this message in a predetermined display form, a person who has input the job, i.e. the user, can recognize that it is necessary to set the job again without viewing the device history. Further, this makes it possible to avoid such an inconvenience that the user forgets to set the job again, or is delayed in setting the job again.

Although in the case where the setting of not performing recovery processing after sheet jam elimination is set, the above-mentioned notification is transmitted to the PC 102 as the source of the input job, the notification destination may be designated when performing device configuration or making job settings via the console section 204. This increases the notification effect of the message.

Referring again to FIG. 4, after notifying the user that it is necessary to set the job again, the CPU 205 cancels the job as a result of execution of the job (step S512). Then, the CPU 205 records cancellation of the job in the RAM 208 or the HDD 209 as the device history in association with the information on the job (step S514). The user can refer to the recorded history by operating the console section 204. After storing cancellation of the job (step S514), the CPU 205 terminates the printing process.

On the other hand, if it is determined in the step S503 that no sheet jam has occurred (NO to the step S503), the CPU 205 determines whether or not the job has been terminated (step S505). The definition of termination of a job includes not only successful termination of the job in which print processing has been completed up to the last page, but also interruption of the job according to an instruction for canceling the job, which is input by the user operating the console section 204, based on the user's judgment.

Note that the message shown in FIG. 7A indicates that it is necessary to input the job again, according to the setting of the recovery processing after sheet jam elimination, which is included in the job settings. However, in the case where the job is interrupted by the user's operation, it is unnecessary to notify the user that it is necessary to set the job again. In this case, the cancellation of the job is recorded in the device history. The same is applied to a result notified e.g. by "Command-ReturnQueueEntry" which is a message for notifying a user of a printing result. This is because in the case where the user intentionally cancels the job by the user's operation, it is sometimes unnecessary to set the job again, and in this case, since the user is aware whether or not it is necessary to set the job again, the notification is unnecessary.

If it is determined in the step S505 that the job has been terminated (YES to the step S505), the CPU 205 proceeds to a step S507. In this step, the CPU 205 determines whether or not the job settings analyzed in the step S501 include the setting of not performing recovery processing after sheet jam elimination (step S507). If it is determined in the step S507 that the job settings include the setting of not performing recovery processing (YES to the step S507), the CPU 205 proceeds to a step S510. In this step, the CPU 205 notifies the PC 102 that it is unnecessary to set the job again, via the external interface 210 (step S510). In a case where the job of which the job settings include the setting of not performing recovery processing after sheet jam elimination has been terminated without occurrence of a sheet jam, the message, shown in FIG. 7B, to the effect that it is unnecessary to set the job again, is notified.

After notifying the PC 102 that it is unnecessary to set the job again (step S510), the CPU 205 proceeds to a step S513. In this step, the CPU 205 determines whether or not the termination of the job, determined in the step S505, is successful termination, i.e. completion, of the job (step S513). If it is determined in the step S513 that the termination of the job is successful termination, i.e. completion (YES to the step S513), the CPU 205 proceeds to a step S515. In this step, the CPU 205 stores completion of printing in the RAM 208 or the HDD 209 as the execution result of the job in association with the information on the job (step S515). The user can refer to the stored execution result by operating the console section 204. After storing completion of the job and the information on the job, the CPU 205 terminates the printing process.

On the other hand, if it is determined in the step S513 that the termination of the job is not successful termination (NO to the step S513), the CPU 205 proceeds to the step S514, and records cancellation of the job in the device history. As mentioned above, the termination of a job includes not only successful termination of the job, but also cancellation of the job by the user. If the job has been terminated (YES to the step S505) but has not been successfully terminated (NO to the step S513), it is considered that the job has been canceled by the user, and hence the cancellation of the job is recorded in the step S514.

Further, if it is determined in the step S507 that the setting of not performing recovery processing is not included in the job settings (NO to the step S507), the CPU 205 directly proceeds to the step S513 without notifying the PC 102 that it is unnecessary to set the job again. In a case where the setting of not performing recovery processing is not included in the job settings, such as a case where the setting of performing recovery processing is included in the job settings, recovery processing is performed after sheet jam elimination, and hence it is unnecessary to provide the notification for calling user's attention.

Although recovery processing after sheet jam elimination is processing for resuming printing from a page on which the sheet jam has occurred after the sheet jam is eliminated, page missing or page duplication sometimes occurs in the final product due to a deviation of the disposed position of the sensor or the like. A user who makes the setting of not performing recovery processing after sheet jam elimination is supposed to be a person who intends to obtain a print deliverable with high accuracy by avoiding occurrence of the above-mentioned inconvenience, and the present embodiment positively relieves such a user.

Referring again to FIG. 4, if it is determined in the step S505 that the job has not been terminated (NO to the step S505), the CPU 205 returns to the step S503.

Further, if it is determined in the step S506 that the setting of not performing recovery processing is not included in the job settings (NO to the step S506), the CPU 205 proceeds to a step S508. In this step, the CPU 205 determines whether or not the setting of not performing recovery processing is included in device settings (step S508).

Figure 8:
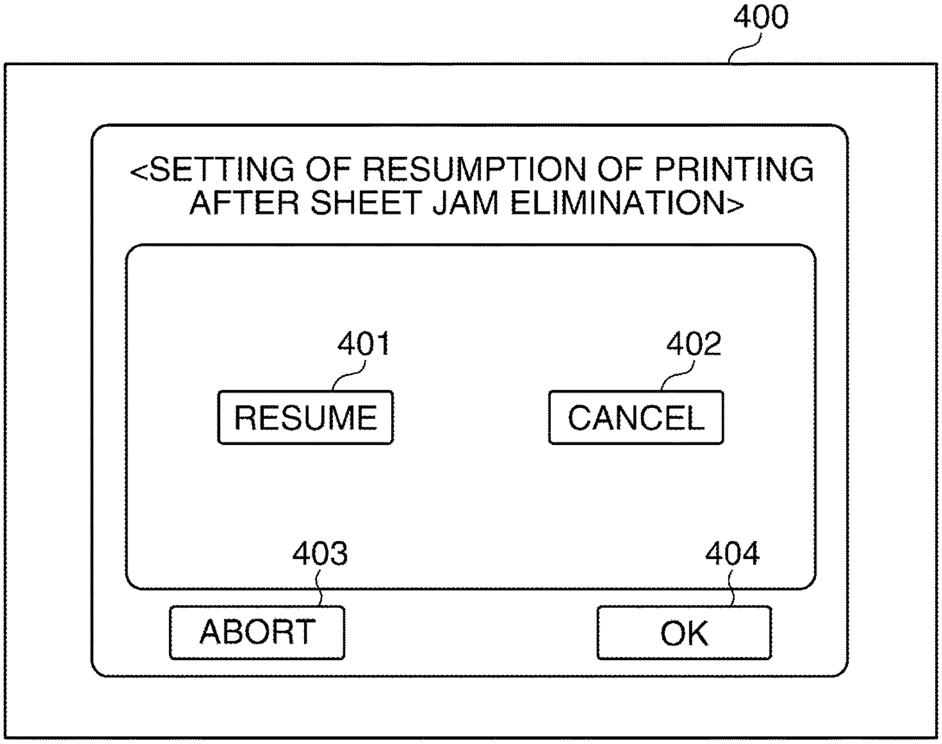
FIG. 8 is a diagram of a screen for making a setting of recovery processing to be performed after sheet jam elimination, for device configuration.

FIG. 8 is a diagram of a screen 400 for making a setting of recovery processing to be performed after sheet jam elimination, for device configuration. Data input from the user via the console section 204 is transferred to the CPU 205, and the screen displayed on the console section 204 is switched by a command from the CPU 205.

In response to an instruction from the user for displaying the screen 400 for making a setting of recovery processing to be performed after sheet jam elimination, the CPU 205 displays the screen 400, shown in FIG. 8, on the console section 204. The screen 400 is for specifying whether or not to perform recovery processing after sheet jam elimination, for the device configuration. Note that the device configuration is performed when the MFP 101 is installed, or thereafter, on an as-needed basis.

Referring to FIG. 8, a resume button 401 is a button for making the setting of performing recovery processing after sheet jam elimination. In a case where the setting of performing recovery processing after sheet jam elimination is made as a device setting, recovery processing after sheet jam elimination is performed for a job of which the job settings do not include the setting concerning recovery processing after sheet jam elimination or include the setting of performing recovery processing after sheet jam elimination. On the other hand, in a case where the setting of not performing recovery processing after sheet jam elimination is set as a device setting, recovery processing after sheet jam elimination is not performed.

A cancel button 402 is a button for making the setting of not performing recovery processing after sheet jam elimination. In a case where the setting of not performing recovery processing after sheet jam elimination is set as a device setting, even when the setting of performing recovery processing after sheet jam elimination is included in the job settings, recovery processing after sheet jam elimination is not performed. The setting of not performing recovery processing after sheet jam elimination, as the device setting, overrides the setting of performing recovery processing after sheet jam elimination, as the job setting. This is to relieve a user who uses a device (apparatus) configured not to perform recovery processing after sheet jam elimination in order to obtain prints having higher quality.

In FIG. 8, when each of the resume button 401 and the cancel button 402 is in a selected state, it is displayed in a different color. These two buttons are prevented from being selected at the same time, and in a state where one of the buttons has already been selected, if the other button is selected, the newly selected button is shifted to the selected state, and the previously selected button is released from the selected state. In a case where a selected state of one of the buttons is stored in the RAM 208, the selected state is the initial state of the button. If the setting operation has never been performed by the user, the setting of performing recovery processing after sheet jam elimination is a default state.

An abort button 403 is a button for terminating configuration of recovery processing to be performed after sheet jam elimination. In a case where selection of the abort button 403 is received, the specification of recovery processing after sheet jam elimination is discarded without storing the same, and the screen is returned to a previous screen displayed before displaying the screen 400.

An OK button 404 is a button for terminating configuration of recovery processing to be performed after sheet jam elimination. In a case where selection of the OK button 404 is received, the selected state of one the buttons is stored in the RAM 208 as the device setting of recovery processing after sheet jam elimination, and then the screen is returned to a previous screen displayed before displaying the screen 400.

Referring again to FIG. 4, if it is determined in the step S508 that the setting of not performing recovery processing is included in the device settings (YES to the step S508), the CPU 205 proceeds to the step S512, and cancels the job. In this case, the notification for calling user's attention is not provided. The user has not made the setting of not performing recovery processing after sheet jam elimination as the job setting, and hence it is considered that the user is considerably careful or does not demand high accuracy of prints. Therefore, the notification for calling user's attention is unnecessary. However, also in this case, the notification to the effect that it is necessary to set the job again may be provided.

On the other hand, if it is determined in the step S508 that the setting of not performing recovery processing is not included in the device settings (NO to the step S508), the CPU 205 resumes the job (step S511), and returns to the step S503. Resumption of the job refers to resumption of printing from a page next to the page which has been output before occurrence of a sheet jam. Note that depending on a location or a time of occurrence of a sheet jam, there is a possibility that a sheet which has not been output is determined as a sheet which has been output, causing page missing, or a sheet which has been output is determined as a sheet which has not been output, causing page duplication.

According to the process in FIG. 4, in a case where the setting of not performing recovery processing after sheet jam elimination is included in the job settings (YES to the step S506), the CPU 205 notifies, after jam clearance processing, the user that it is necessary to set the job again (step S509). This makes it possible to cause the user after jam clearance processing to recognize an operation required to be performed, and hence it is possible to eliminate such an inconvenience that the user forgets to set the job again or is delayed in setting the job again, and relieve the user who has made the setting of not performing recovery processing after sheet jam elimination.

Further, according to the present embodiment, if a job of which the job settings include the setting of not performing recovery processing after sheet jam elimination has been terminated without occurrence of a sheet jam (YES to the step S507), the user is notified that it is unnecessary to set the job again (step S510). With this, the user who has made the setting of not performing recovery processing after sheet jam elimination can confirm that the job has been terminated and it is unnecessary to set the job again, which enhances the convenience for the user.

Note that in a case where the setting of performing recovery processing after sheet jam elimination is made as the job setting, the result of the job is not notified regardless of whether or not a sheet jam has occurred. This is because it is considered that the user who has made the setting of performing recovery processing after sheet jam elimination as the job setting is considerably careful or does not demand a printing result with high accuracy. This also makes it possible to simplify processing.

In the present embodiment, in a case where the setting of not performing recovery processing after sheet jam elimination is set as the device setting, this setting of not performing recovery processing after sheet jam elimination overrides the job setting regardless of whether the job setting is the setting of not performing recovery processing after sheet jam elimination or the setting of performing recovery processing after sheet jam elimination. This is to relieve a user who uses a device (apparatus) configured not to perform recovery processing after sheet jam elimination in order to obtain prints having higher quality.

That is, even when the setting of performing recovery processing is included in the job settings, the setting of not performing recovery processing after sheet jam elimination, as the device setting determined in the step S508, is effective, so that the job is canceled in the step S512. In a case where the setting of performing recovery processing after sheet jam elimination is included the device settings (NO to the step S508) and the setting of performing recovery processing after sheet jam elimination is included in the job settings, recovery processing is performed.

Further, in a case where specification of whether or not to perform recovery processing is not included in the job settings (NO to the step S506), whether or not to perform recovery processing after sheet jam elimination is determined according to the device settings. More specifically, if it is determined in the step S508 that the setting of not performing recovery processing after sheet jam elimination is included in the device settings, the job is canceled (step S512). On the other hand, if it is determined in the step S508 that the setting of performing recovery processing after sheet jam elimination is included in the device settings, the job is resumed (step S511).

The image forming apparatus according to the present embodiment also corresponds to an image forming system in which the large-capacity sheet feeder 220 and the inserter 221 are connected to the printer section 201.

In the present embodiment, the job settings refer to settings made via the external interface 210, on a job-by-job basis, and includes settings of a print job, which are associated with print data. A user can make a setting of whether or not to perform recovery processing after sheet jam elimination as a job setting. Further, the device settings refers to settings which are made principally when the image forming apparatus 101 is installed, for defining common conditions applied to all jobs which are executed by the image forming apparatus 101. A user can also make a setting of whether or not to perform recovery processing after sheet jam elimination, as a device setting.

Next, a description will be given of a second embodiment.

In the above-described first embodiment, in a case where a sheet jam occurs in a job of which the job settings include the setting of not performing print recovery processing after sheet jam elimination, the user is notified that it is necessary to input the job again.

However, in a case where the job settings include the setting of performing print recovery processing after sheet jam elimination, if the device settings include the setting of not performing print recovery processing after sheet jam elimination, there is a possibility that the user cannot be aware that it is necessary to input the job again.

To cope with this, in the second embodiment, in a case where there is inconsistency between the job setting and the device setting concerning the recovery processing after sheet jam elimination, which implies that a user's intention at the time of inputting of a job and a user's intention at the time of execution of the job do not necessarily match each other, the user is notified of the inconsistency between the settings.

A printing process performed in the second embodiment as a whole is the same as the printing process described hereinabove with reference to FIG. 4, and hence description thereof is omitted.

Figure 9:
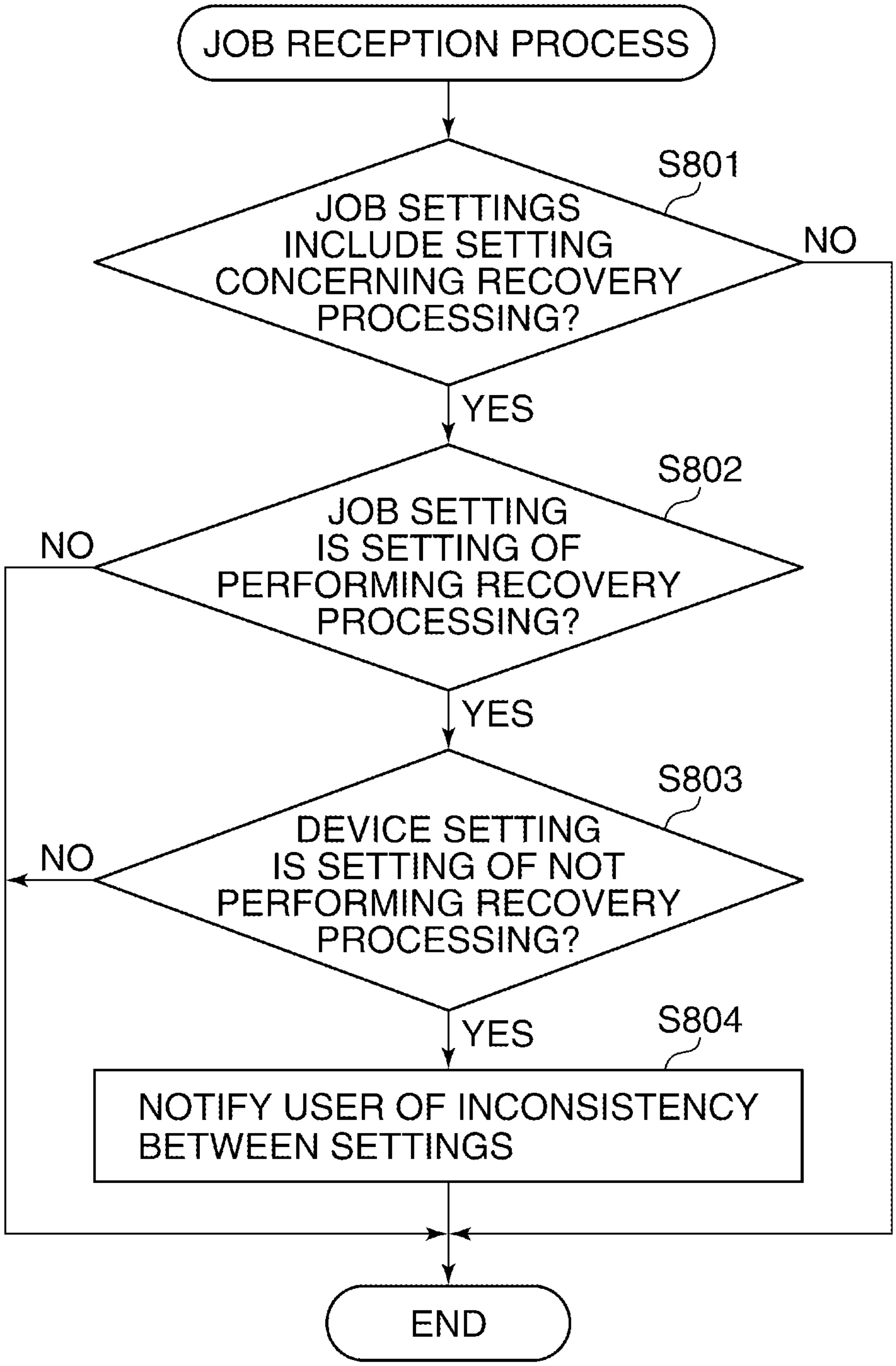
FIG. 9 is a flowchart of a job receiving process for checking consistency between the settings.

FIG. 9 is a flowchart of a job receiving process for checking consistency between the settings. The job receiving process in FIG. 9 is part of processing for analyzing the job settings, performed in the step S501 in FIG. 4, with a view to checking consistency between the job setting and the device setting concerning the recovery processing after sheet jam elimination. This job receiving process is performed by the CPU 205 according to a job receiving process program stored in the ROM 207.

Referring to FIG. 9, the job receiving process for checking consistency of the settings is started upon termination of the above-described processing for analyzing the job settings in the step S501.

When the present process is started, the CPU 205 determines whether or not the analyzed job settings include a setting concerning recovery processing after sheet jam elimination (step S801). If it is determined in the step S801 that the analyzed job settings include the setting concerning recovery processing after sheet jam elimination (YES to the step S801), the CPU 205 proceeds to a step S802, wherein the CPU 205 determines whether or not the setting concerning recovery processing after sheet jam elimination, included in the job settings, is the setting of performing recovery processing after sheet jam elimination (step S802).

If it is determined in the step S802 that the setting included in the job settings is the setting of performing the recovery processing (YES to the step S802), the CPU 205 determines whether or not a setting concerning the recovery processing after sheet jam elimination, included in the device settings, is the setting of not performing the recovery processing (step S803). If it is determined in the step S803 that the setting included in the device settings is the setting of not performing the recovery processing (YES to the step S803), the CPU 205 proceeds to a step S804. In this step, the CPU 205 displays a message, on the display section of the console section 204, to the effect that the setting concerning the recovery processing after sheet jam elimination is different between the job setting and the device setting, and also sends the same notification to the PC 102 (step S804), followed by terminating the present process. The notification destination may be the same as that of the first embodiment, or a different notification destination may be designated.

On the other hand, if it is determined in the step S803 that the setting included in the device settings is the setting of performing the recovery processing (NO to the step S803), the CPU 205 terminates the present process. Further, if it is determined in the step S802 that the setting included in the job settings is the setting of not performing the recovery processing (NO to the step S802), the CPU 205 terminates the present process. Further, if it is determined in the step S801 that the analyzed job settings include no setting concerning the recovery processing after sheet jam elimination (NO to the step S801), the CPU 205 terminates the present process. This is because there is no need of notifying the user of inconsistency between the settings in these cases.

According to the process in FIG. 9, in a case where the job settings include the setting of performing recovery processing (YES to the step S802), and also the device settings include the setting of not performing recovery processing (YES to the step S803), the inconsistency between the settings is notified. This enables the user to know in advance that recovery processing is not to be performed because the device setting overrides the job setting, and that as a result, the job may be canceled, and to cope with this inconvenience e.g. by changing the setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-121505 filed Jun. 21, 2017, which is hereby incorporated by reference herein in its entirety.

What is claimed is:

1. An image forming apparatus comprising:

a feeder configured to feed sheets;

a printer configured to form images;

a memory configured to store instructions; and a processor configured to execute the instructions to:

receive print data and settings of a print job which are associated with the print data:

control the printer to form an image on a sheet fed from the feeder based on the received print data; and determine whether the settings of the print job include a setting of not performing print recovery processing after sheet jam elimination, wherein, in a case where it is determined that the settings of the print job include the setting of not performing print recovery processing after sheet jam elimination, the processor is further configured to execute the instructions to cancel the print job in response to the sheet jam being resolved after the sheet jam has occurred in the printer, record cancellation of the print job in the memory as an execution result of the print job, and perform notification of information to input the print job again, and wherein, in a case where it is determined that the settings of the print job do not include the setting of not performing print recovery processing after sheet jam elimination, the processor is further configured to execute the instructions to resume the print job after sheet jam elimination and record completion of printing in the memory as an execution result of the print job.

2. The image forming apparatus according to claim 1, wherein the processor is further configured to execute the instructions to, after stopping the print job, record stopping of the print job.

3. The image forming apparatus according to claim 1, wherein the print job is received via an external apparatus, and wherein, in a case where a print job whose settings include the setting of not performing the recovery processing after sheet jam elimination is completed without occurrence of a sheet jam, the processor is further configured to execute the instructions to perform notification that it is unnecessary to transmit the print job again, to the external apparatus.

4. The image forming apparatus according to claim 3, wherein the processor is further configured to execute the instructions to, after completing the print job, record completion of the print job.

5. The image forming apparatus according to claim 1, wherein the settings of the print job include a setting of a destination of the notification.

6. The image forming apparatus according to claim 1, wherein the processor is further configured to execute the instructions to receive device settings including a setting of not performing print recovery processing after sheet jam elimination, and wherein in a case where the settings of the print job do not include the setting of not performing print recovery processing after sheet jam elimination, and the device settings include the setting of not performing print recovery processing after sheet jam elimination, priority is given to the device setting of not performing print recovery processing after sheet jam elimination.

7. The image forming apparatus according to claim 6, wherein, in a case where a print job whose settings include the setting of not performing the print recovery processing after sheet jam elimination is stopped as a result of giving priority to the device setting, the processor is further configured to execute the instructions not to perform notification that it is necessary to input the print job again after sheet jam eliminating, to a user.

8. The image forming apparatus according to claim 6, wherein in a case where a print job whose settings include the setting of not performing the print recovery processing after sheet jam elimination is stopped as a result of giving priority to the device setting, the processor is further configured to execute the instructions to perform the notification of information prompting the user to input the print job again.

9. The image forming apparatus according to claim 6, wherein in a case where the settings of the print job and the device settings are different from each other, the processor is further configured to execute the instructions to perform notification that there is inconsistency in the settings of whether or not to perform print recovery processing after sheet jam elimination.

10. The image forming apparatus according to claim 9, wherein the settings of the print job or the device settings include a setting of a destination of the notification.

11. An image forming apparatus comprising:

a feeder configured to feed sheets;

a printer configured to form images;

a communication interface configured to transmit and receive information to and from an external apparatus;

a memory configured to store instructions; and a processor configured to execute the instructions to:

control the printer to form an image on a sheet fed from the feeder based on print data and settings of a print job which are associated with the print data, received via the communication interface; and determine whether the settings of the print job include a setting of not performing print recovery processing after sheet jam elimination, wherein, in a case where it is determined that the settings of the print job include the setting of not performing print recovery processing after sheet jam elimination, the processor is further configured to execute the instructions to cancel the print job in response to the sheet jam being resolved after the sheet jam has occurred in the printer, record cancellation of the print job in the memory as an execution result of the print job, and perform notification of information to transmit the print job again, to the external apparatus, and wherein, in a case where it is determined that the settings of the print job do not include the setting of not performing print recovery processing after sheet jam elimination, the processor is further configured to execute the instructions to resume the print job after sheet jam elimination and record completion of printing in the memory as an execution result of the print job.

* * * * *